(12) United States Patent
Chen et al.

(10) Patent No.: US 8,965,870 B2
(45) Date of Patent: Feb. 24, 2015

(54) METHOD AND APPARATUS FOR EXCHANGING MEDIA SERVICE QUERIES

(75) Inventors: Ren Lei Chen, Beijing (CN); Xiao-jun Ma, Beijing (CN); Jun Li, Cranbury, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 13/138,093

(22) PCT Filed: Dec. 23, 2009

(86) PCT No.: PCT/US2009/006701
§ 371 (c)(1),
(2), (4) Date: Jul. 1, 2011

(87) PCT Pub. No.: WO2010/080140
PCT Pub. Date: Jul. 15, 2010

(65) Prior Publication Data
US 2011/0276557 A1      Nov. 10, 2011

(30) Foreign Application Priority Data
Jan. 7, 2009   (EP) .................................... 09305009

(51) Int. Cl.
*G06F 7/00*         (2006.01)
*G06F 17/30*        (2006.01)
(52) U.S. Cl.
CPC .... *G06F 17/30038* (2013.01); *G06F 17/30277* (2013.01); *G06F 17/30398* (2013.01)
USPC ........................... 707/706; 707/758; 707/771

(58) Field of Classification Search
CPC ..................... G06F 17/30023; G06F 17/30398
USPC .......................................... 707/706, 758, 771
See application file for complete search history.

(56) References Cited

U.S. PATENT DOCUMENTS

| | | | |
|---|---|---|---|
| 7,503,007 B2 * | 3/2009 | Goodman et al. ............ | 715/758 |
| 2002/0133550 A1 * | 9/2002 | Mears et al. .................. | 709/204 |
| 2003/0097301 A1 | 5/2003 | Kageyama et al. | |

(Continued)

FOREIGN PATENT DOCUMENTS

| | | |
|---|---|---|
| CN | 101075929 | 11/2007 |
| EP | 1906316 | 4/2008 |

(Continued)

*Primary Examiner* — Alicia Lewis
(74) *Attorney, Agent, or Firm* — Vincent E. Duffy; Joel M. Fogelson

(57) ABSTRACT

A user accessing a media service desires to find out more information about the media service by formulating a query, by operation of an input device, where a region of interest of said media service is selected by the user. The query is submitted to other users who are defined by various tiers defined by different types of criteria. The users belonging to such tiers respond back to the query with new information, which is rendered on the media device being used by the user. Such responses are then rendered on the media device of the user. Optionally, a computer assistance mode is operated where keywords are extracted from said communications between users, and such keywords a used to obtain additional results from a resource such as a search engine.

10 Claims, 8 Drawing Sheets

(56) References Cited

U.S. PATENT DOCUMENTS

| | | |
|---|---|---|
| 2005/0060350 A1 | 3/2005 | Baum et al. |
| 2007/0192357 A1* | 8/2007 | Grizzard ....................... 707/102 |
| 2008/0120501 A1 | 5/2008 | Jannink et al. |
| 2008/0209351 A1* | 8/2008 | Macadaan et al. ............ 715/762 |
| 2008/0281783 A1 | 11/2008 | Papkoff et al. |
| 2008/0299953 A1* | 12/2008 | Rao ............................ 455/414.1 |
| 2009/0125499 A1* | 5/2009 | Cross et al. ....................... 707/5 |

FOREIGN PATENT DOCUMENTS

| | | |
|---|---|---|
| JP | 2003150529 | 5/2003 |
| JP | 2007317217 | 6/2007 |
| TW | 200425677 | 12/2003 |
| TW | 200427269 | 12/2003 |
| WO | WO2004111901 | 12/2004 |
| WO | 2010080140 | 7/2010 |

* cited by examiner

METHOD AND APPARATUS FOR EXCHANGING MEDIA SERVICE QUERIES

This application is a National Stage Application and claims the benefit, under 35 U.S.C. §365 of International Application PCT/US2009/006701 filed Dec. 23, 2009, which was published in accordance with PCT Article 21(2) on Jul. 15, 2010 in English, and which claims the benefit of European patent application No. 09305009.4, filed Jan. 7, 2009.

FIELD OF THE INVENTION

The invention concerns the rendering of media services, specifically when such media services are not fully descriptive of their content.

BACKGROUND OF THE INVENTION

When a user is watching television program, a user can want to identify something about the television show such as an actor being shown on the screen, or a piece of music that is being outputted during the television program. Typically, a user can use an information resource such as a program guide listing which can list particular actors. Likewise, a user can wait until the end of the program to review the credits of the television show to see if the music track is identified because of copyright information.

Many times, the above approaches do not yield satisfactory results because a user has to spend several minutes if not hours determining whether such resources are providing accurate information. A user can decide to utilize a resource such as the Internet by using an encyclopedia site such as Wikipedia or Internet Movie Data Base. Even when a user uses such resources, once again the user will be required to spend a large amount time determining whether such information, when accessed, is accurate or not.

SUMMARY OF THE INVENTION

A method is disclosed which enables provides a user to submit a portion of a media service to other users by operation of an interface, where the users enter back information about the media service to the original user. The method optionally uses a computer enhancement service which helps with annotation of the media service.

DETAILED DESCRIPTION OF THE INVENTION

For purposes of this application, the term media service can be audio services (e.g., music, radio based talk show, streaming audio) and/or video services (e.g., television shows, movies, computer/video games). Such media services can be received via a remote source (e.g., satellite, Internet, cable, broadcast antenna, public switched telephone network (PSTN), cellular network, infrared transmitter), as a service provider, transmits media services signals that are received by multimedia devices including, for example, digital satellite systems, modems, and antennas. These types of devices process the media services signals and can distribute such services to other devices or a device that such components are connected to. Multimedia devices such as digital satellite systems and modems can be bi-directional; so as to communicate with remote sources for requesting media services (for example, a video on demand programming from a cable service, an Internet source such as Netflix and the like, and a bi-directional multimedia service operator who delivers via a connection audio and video services), electronic program guide information, upgrading software drivers and codecs, and the like.

Examples of the content of media service files includes songs, political speeches, news broadcasts, movie trailers, movies, television shows, live broadcasts, radio broadcasts, financial conference calls, live concerts, web-cam footage, and other special events; although this list is not exhaustive.

This application also makes use of the term "media service device" which is a device that is capable of rendering a media service. Examples of media service devices include televisions, radios, set top boxes, computers, desktop computers, laptop computers, video game systems, telephones, portable media device, MP3 players, portable audio devices, portable video devices, and combination thereof, and the like, where such a definition is not limited to future or currently known devices.

Figure 1:
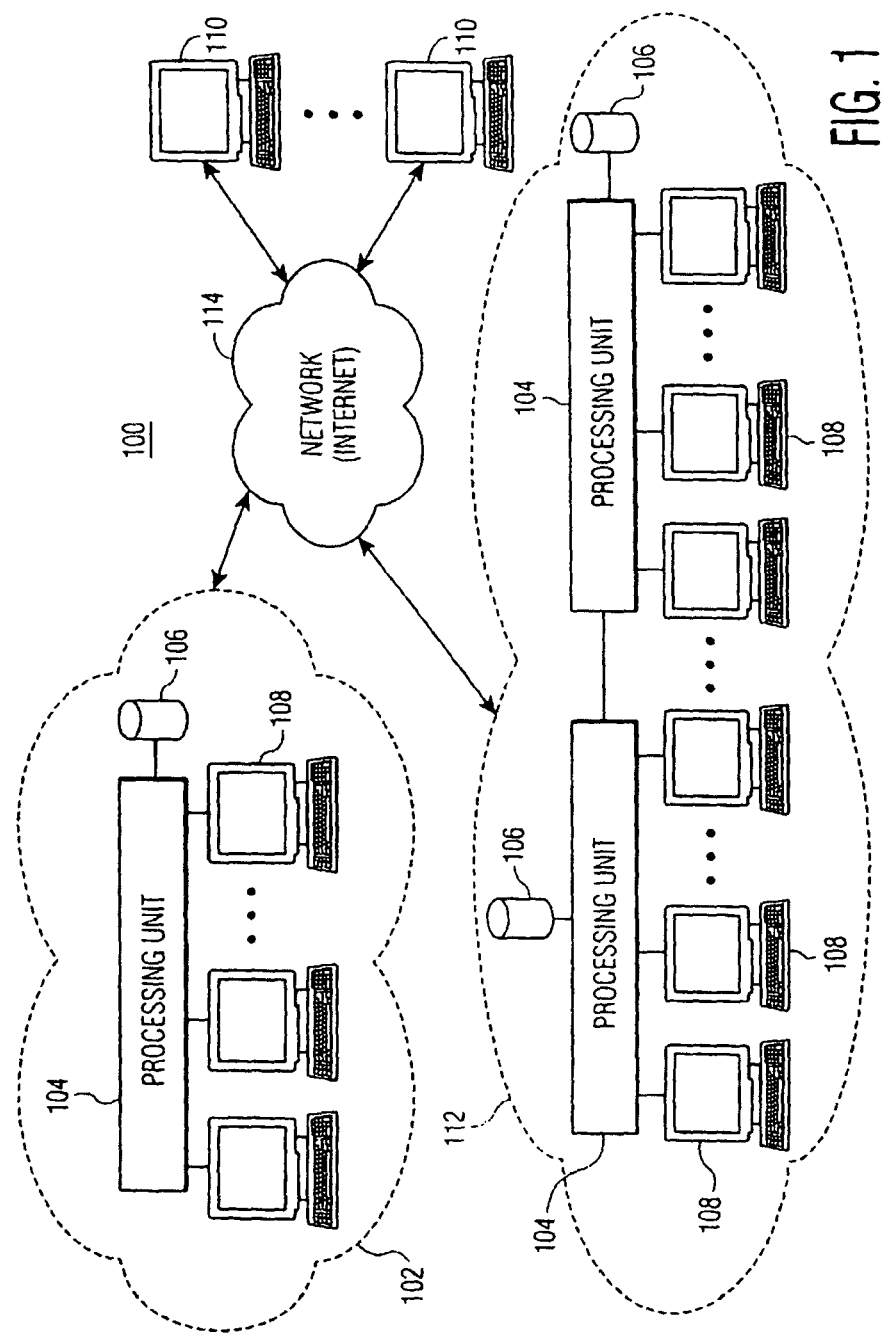
FIG. 1 is an exemplary embodiment of a system of computer devices, operating as media devices, in accordance with the principles of the present invention.

FIG. 1 shows an overview of a system 100 that has media services available through a communications network. Each computer system network 102 and 112 contains at least one corresponding local computer processor unit 104 (e.g., server), which is coupled to at least one corresponding local data storage unit 106 (e.g., database), and local network users 108. A computer system network can be a local area network (LAN) 102 or a wide area network (WAN) 112, for example. The local computer processor units 104 are selectively coupled to media centers 110 through the network (e.g., Internet) 114. Each of the plurality of local computer processors 104, the network user processors 108, and/or the media centers 110 can have various devices connected to system, for example a computer system, television set, video tape recorder, personal video recorder, digital video disc (DVD), and the like. A local computer processor 104, network user processor 108, and/or media center 110 are programmed with a media browser for locating and selecting (e.g., by clicking with a mouse) a media service that is located in the local data storage unit 106 of a computer system network 102, 112. The media services can contain links to other computer systems, Web pages, and other media content.

Local computer processor 104 and network user processor 108 can, for example, be a computer terminal, a pager which can communicate through the Internet using an Internet Protocol (IP) based communication, a Kiosk with Internet access, a connected electronic organizer/communication device (e.g., a BLACKBERRY device manufactured by Blackberry, Inc.) or other device capable of interactive communication through a network, such as an electronic personal planner. The local computer processor 104, the network user processor 108, and/or the media center 110 can also be a wireless device, such as a hand held unit (e.g., cellular telephone such as the IPHONE sold by Apple Computer), that connects to and communicates through the Internet using a wireless based EDGE or 3G network). Networks 102 and 112 can be connected, for example, to the network 114 by a modem connection, a Local Area Network (LAN), cable modem, digital subscriber line (DSL), twisted pair, wireless based interface (cellular, infrared, radio waves), or equivalent connection utilizing data signals. Databases 106 can be connected to the local computer processor units 104 by any means known in the art. Databases 106 can take the form of any appropriate type of memory (e.g., magnetic, optical, etc.). Databases 106 can be external memory or located within the local computer processor 104, the network user processor 108, and/or the media center 110. Database 106 can have media services and related metadata that can be retrieved by media center 110.

In an exemplary embodiment of the invention, network processors 108 and/or media center 110 include one or more program modules that allow user processors 108 and/or media center 110 to communicate with local processor 104, and each other, over network 114. The program module(s) include program code, for example, written in PERL, Extensible Markup Language (XML), JAVA, Hypertext Mark-up Language (HTML), any other equivalent language that allows network user processors 108 to access the program module(s) of the local processors 104 through browser programs stored on network user processors 108, or any combination thereof.

Web sites, web pages, and data stores (FTP, servers, etc.) are locations available through a network, such as the Internet, where media services reside. A web site, and/or data store can comprise a single or several web pages, media services, media content, media files, and the like. A web page is identified by a Uniform Resource Locator (URL), as an example of a URI, comprising the location (address) of the web page on the network. Web sites, web pages, and data stores can be located on local area network 102, wide area network 112, network 114, processing units (e.g., servers) 104, and user processors 108. Media services and related metadata can be stored in any storage device, such as a hard drive, compact disc, and mainframe device, for example. Content can be stored in various formats, which can differ, from web site to web site, from data store to data store, and even within a web page.

Figure 2:
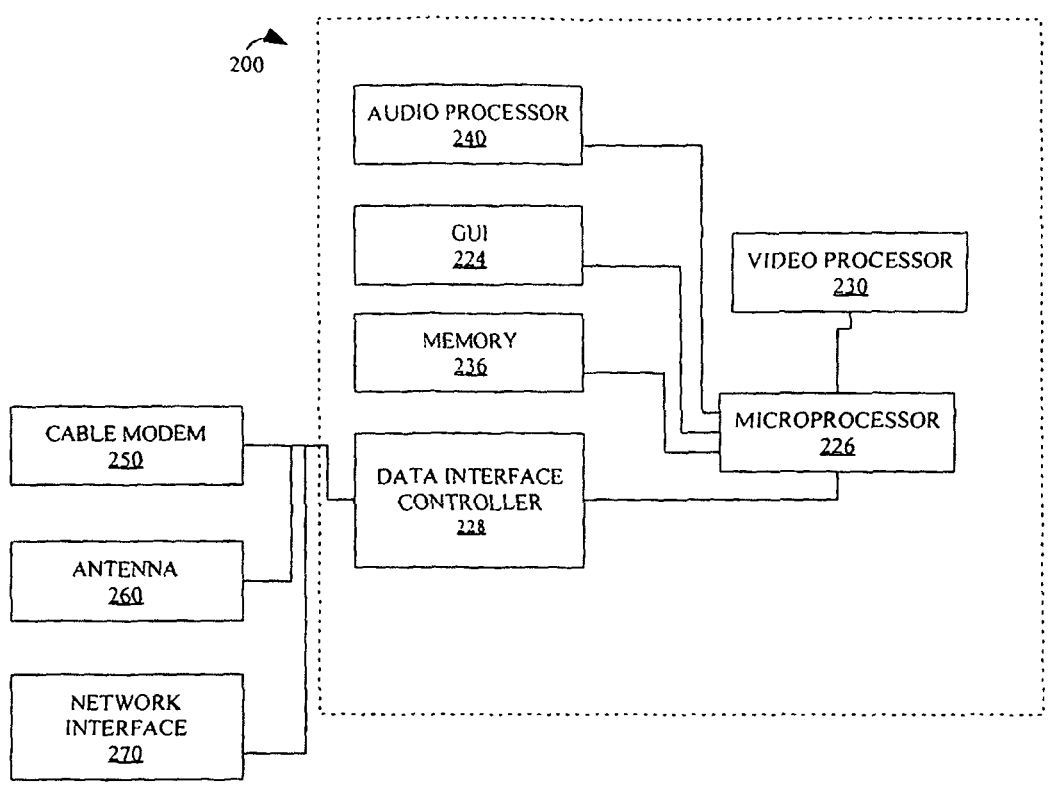
FIG. 2 is an exemplary embodiment of a sample media device, in accordance with the principles of the present invention.

FIG. 2 shows an exemplary embodiment of a set top box 200, as an example of a device capable of receiving. transmitting, and for submitting queries about audio/video media services. Video processor 230 and audio processor 240 are used by set top box 200 for rendering a media service. Video processor 230 also displays characters of selections made via a user control device, as a remote control, via an on screen display (OSD) function. Guided User Interface 224 (GUI) is a control system that allows the functions of set top box 200 (related to rendering a media service, sound/graphic options, and the like) to be controlled FIG. 2 shows an exemplary embodiment of a set top box 200, as an example of a device capable of receiving. transmitting, and for submitting queries about audio/video media services. Video processor 230 and audio processor 240 are used by set top box 200 for rendering a media service. Video processor 230 also displays characters of selections made via a user control device, as a remote control, via an on screen display (OSD) function. Guided User Interface 224 (GUI) is a control system that allows the functions of set top box 200 (related to rendering a media service, sound/graphic options, and the like) to be controlled graphically, as through the use of a user operated indicator (as an arrow, cursor, or the like). Memory 236 stores programming modules, maintenance routines, extracted metadata from media services, search results, and other data necessary to operate set top box 200. Microprocessor 226 controls the operation of set top box 200, where microprocessor 226 is coupled to GUI 224, video processor 230, memory 236, and audio processor 240. Data interface/controller 228 couples microprocessor 226 to a communication interfaces as cable modem 250 (for receiving broadband media services), antenna 260 (for receiving broadcasted programming via terrestrial/satellite sources), or network interface 270 (as another source from receiving broadband media services through a communications network, such as the Internet). Other components or modules can be used with set top box 200, in accordance with the principles of the invention.

Figure 3A:
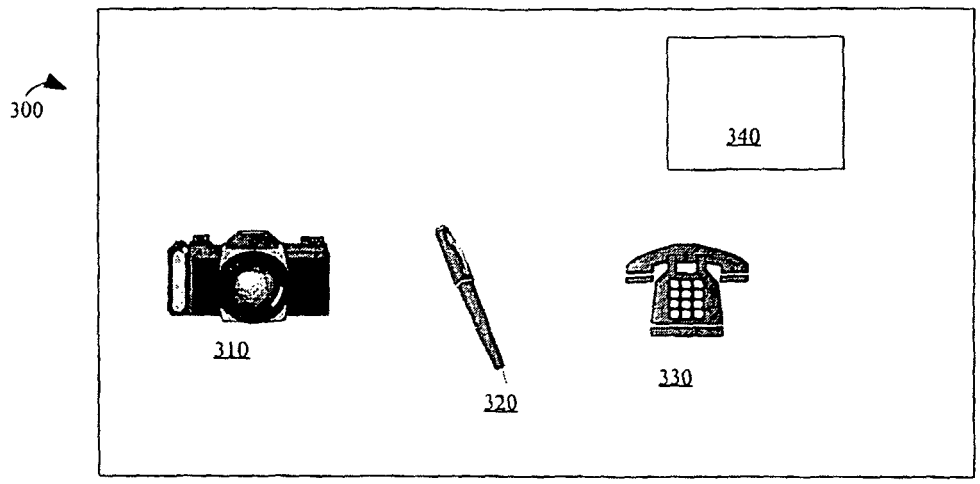
FIGS. 3A-3C represent exemplary embodiments of various user interfaces for a user who submits a media service query, in accordance with the principles of the present invention.

FIG. 3A shows as a sample scene 300 which is representative of a rendered video media service that is received by set top box 200. In this example, there are several objects of interest 310, 320, and 330 which can be selected by the movement of a selector indicator 340. The manipulation of selector indicator 340 can be controlled via an input device such as a keyboard, mouse, arrow keys, controller, joystick, and any other type of input device. Likewise, by use of an input device, selector indicator 340 can be expanded or reduced in size, in accordance with user preferences. Likewise, the form of selector indicator 340 can, for example, be an arrow, a box, a circle, a rectangle, a drawn polygon, an irregularly shaped polygon, and the like.

Figure 3B:
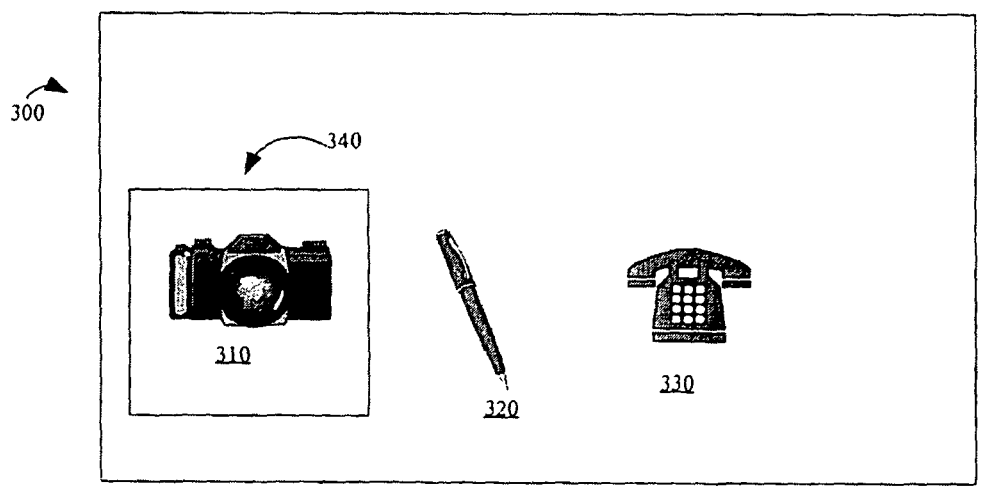

FIG. 3B shows a sample scene 300, where selector indicator 340 is used to select a specific region from a rendered video media service. In the present example, frame 340 is used to select object 310; as an object of interest. The invention will take the contents within frame 340 and produce a screen capture of the contents bounded by frame 340. This screen capture represents the basis of a user query which will be transmitted to other users for descriptive information.

Figure 4A:
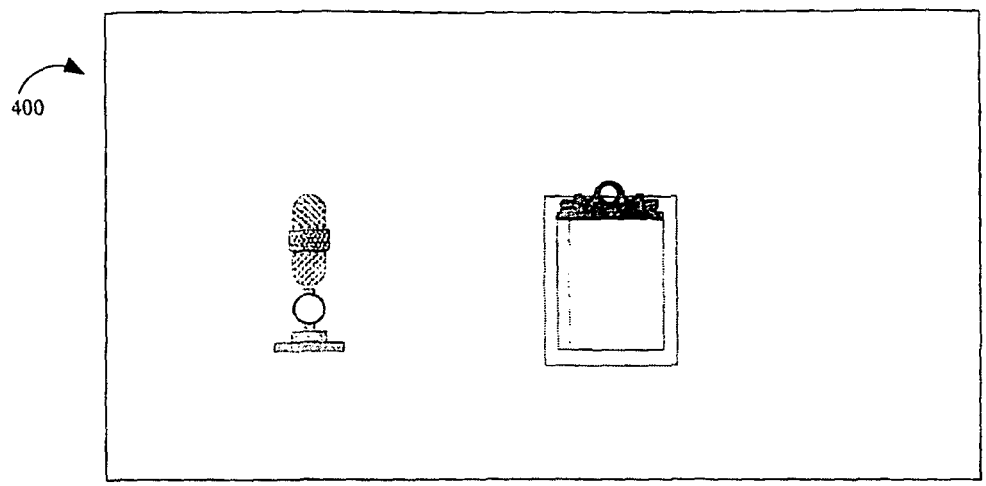
FIGS. 4A-4C represent exemplary embodiments of various user interfaces for users who respond to a media service query, in accordance with the principles of the present invention.
Figure 4B:
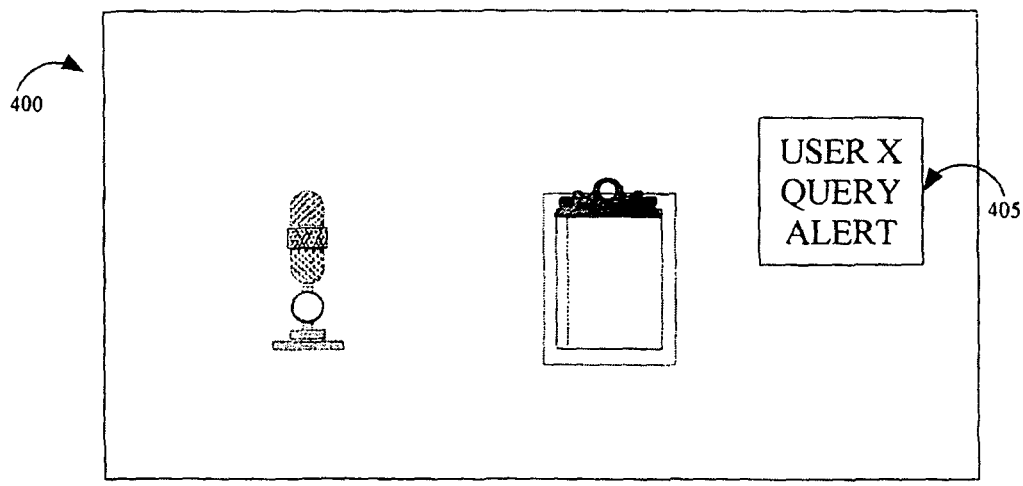

FIG. 4A shows a sample picture of a media service being rendered on a second user's media service device. This picture 400 represents the contents of a rendered video media service. FIG. 4B represents picture 400 with a notification 405 that a first user has submitted a request for comments regarding the contents of frame 340. The notification can represent, for example, a textual message, a graphic, an icon, an audible message, and any combination thereof. The second user has the options of having the contents of the message be rendered (which is shown below in FIG. 4C), deleting the message, saving the message, or ignoring the message, or the user can transfer the message to another party.

Figure 4C:
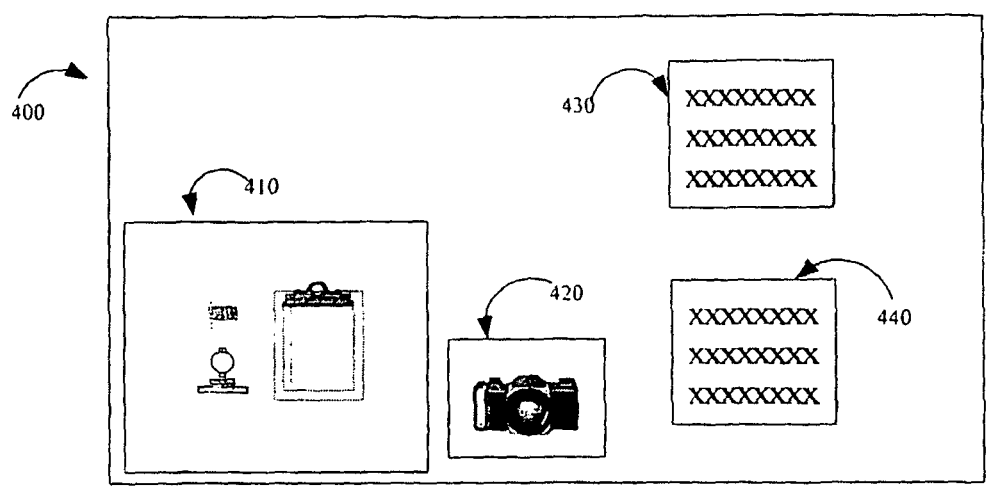

The representation of FIG. 4C, expands the contents of picture 400 into several different regions. Now, the contents of the rendered media service are shown in region 410. The picture contents that the first user submitted for a query is shown in region 420, while a third region 430 is rendered which provides a user an area to submit textual information regarding the contents of region 420. The second user can enter information into region 430 by using an input device such as a keyboard, mouse, arrow keys, controller, joystick, and the like. Additionally, a second user can request that their media service device produce a fourth region 440 which operates as a web browser, such as SAFARI, INTERNET EXPLORER, FIREFOX, and the like, where the second user can use resources accessible via the browser such as a web site, where the second user performs additional research about the contents of region 420. The methods for implementing the split of region 400 into several different regions, such as 410, 420, and 430, can make use of Picture in Picture methods, Picture out of Picture methods, and/or scaling techniques where video pictures are scaled to fit a designated area.

Figure 3C:
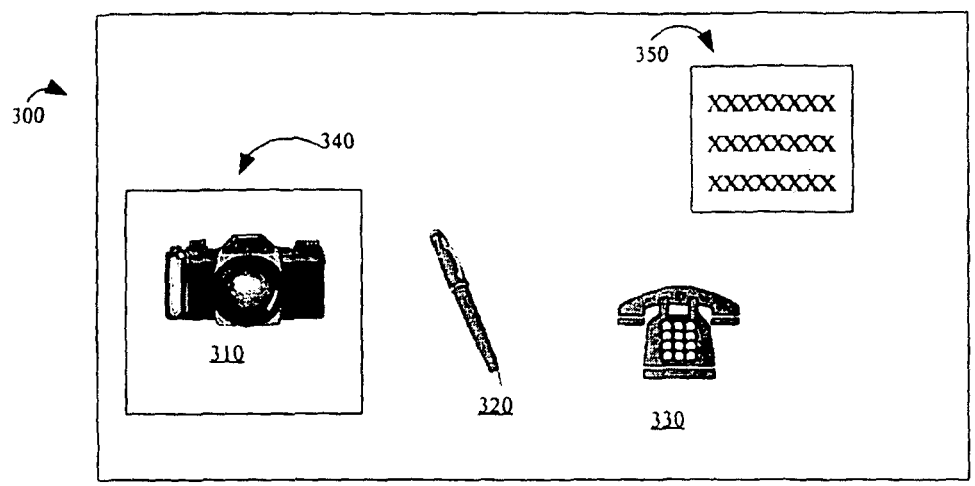

It is expected, that the second user 420 will submit comments, as a response to the query, into region 430, where the comments will be transmitted back to the first user, as shown in FIG. 3C, where for sample scene 300, a new region 350 is rendered which shows the text of the comments that the second user submitted. Likewise, the first user can act on any of the information in region 310, for example if there is a hyperlink in region 310, the user can get to the contents of the link by using a browser. Additionally, the user can submit further queries regarding the contents of region 350, back to the second user, to other users, or to a resource such as a website, search engine, and the like. An optional embodiment to the invention provides that the first user opens a text chat or voice chat channel with the second user to discuss the query results.

Figure 5:
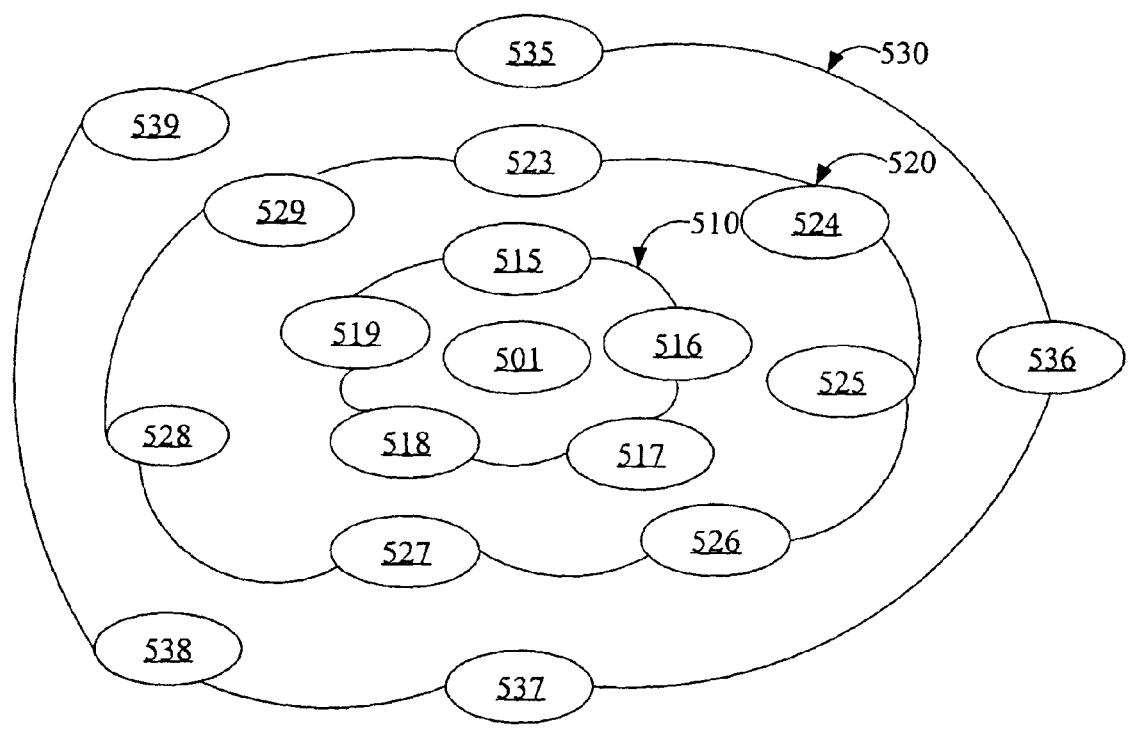
FIG. 5 represents various tiers of users, in accordance with the principles of the present invention.

In accordance with the principles disclosed above, the invention can be expanded out to where more than one user can be communicated with in the submission of query between the first user and n amounts of other users, where n denotes the number of other users in which the first user can be connected to. FIG. 5 gives a sample diagram of concepts of the invention which shows various relationships between the first user and the n amount of other users as constructed in a series of tiers. Specifically, FIG. 5 displays such relationships as a series of nodes, where the first user is represented by node 501. The user (represented by 501) can add amount of desired users to a first tier of users, which is represented by nodes 515-519, which in this example is 5 users. That is, each node represents a distinct user. The grouping of nodes 515-519 can be identified as "first tier" 510. It is contemplated the first tier of users will always be contacted by a user when a query is made about a media service, unless the first user 501 designates otherwise.

The invention also shows additional tiers of users where a second tier 520 and a third tier 530 of users are designated by a first user 501. The second tier 520 represents users which would contacted by a user 501 when a particular submission has a theme that is a common interest to such users in the second tier 520. For example, the user 501 can enjoy classical movies, where users 523-529 can have also indicated an interest in classic movies. If user 501 classifies their query as being related to classic movies, both users in tier 510 and tier 520 will be contacted. if the user 501 changes the classification of the query to another subject, such as sports for example, it is likely that most the users in tier 520 will not receive the contents of first user 501 query. It is expected that users 523-529 can join and leave their linkage on the second tier at will by the use of "join" or "leave" commands which can be submitted to a server.

The third tier of users 530 composed of users 535-539 which instead of joining or leaving a specific thematic group, are users which are accessing or have recently accessed the media service that user 501 is querying or such users 535-539 are accessing the media service at the same time user 501 is having the media service being rendered. Specifically, user 535-539 will be contacted with the user query from user 501 if such users 535-539 designate that they want to field such queries whenever they are presented. Such an option can be toggled at the media service device as a menu option.

It is contemplated that such users 535-539 can also designate a certain time frame from the time they accessed a media service, as to filter out queries submitted by user 501. For example, user 535 can designate that any queries that are received concerning media services, accessed by user 535, from up to two weeks ago will not be presented. Likewise, user 536 can designate that any queries related to a media service in which was accessed by user 536 from a day ago will not be presented on user 533's media service device. It is contemplated that other options of time limits can be utilized, in accordance with the principles of the invention.

In the addition or deletion of users, a first user 501 can add other users (such as 505 and 507) by using a user identifier (user id) that corresponds to each user respectively. Such user ids can be e-mail addresses, user tags, phone numbers, messaging id tags, and the like. Additionally, it is contemplated that the users can use different media service devices, where the first user 501 adds or deletes them from a communication list. For example, user 505 can use a set top box while user 507 is watching video programming via a cellular phone. Likewise, a first user can designate which tier a user belongs where a user 536 can be switched from tier three 530 to either first tier 510 or second tier 520. Additional tiers can be constructed in accordance with the principles of the present invention.

Figure 6:
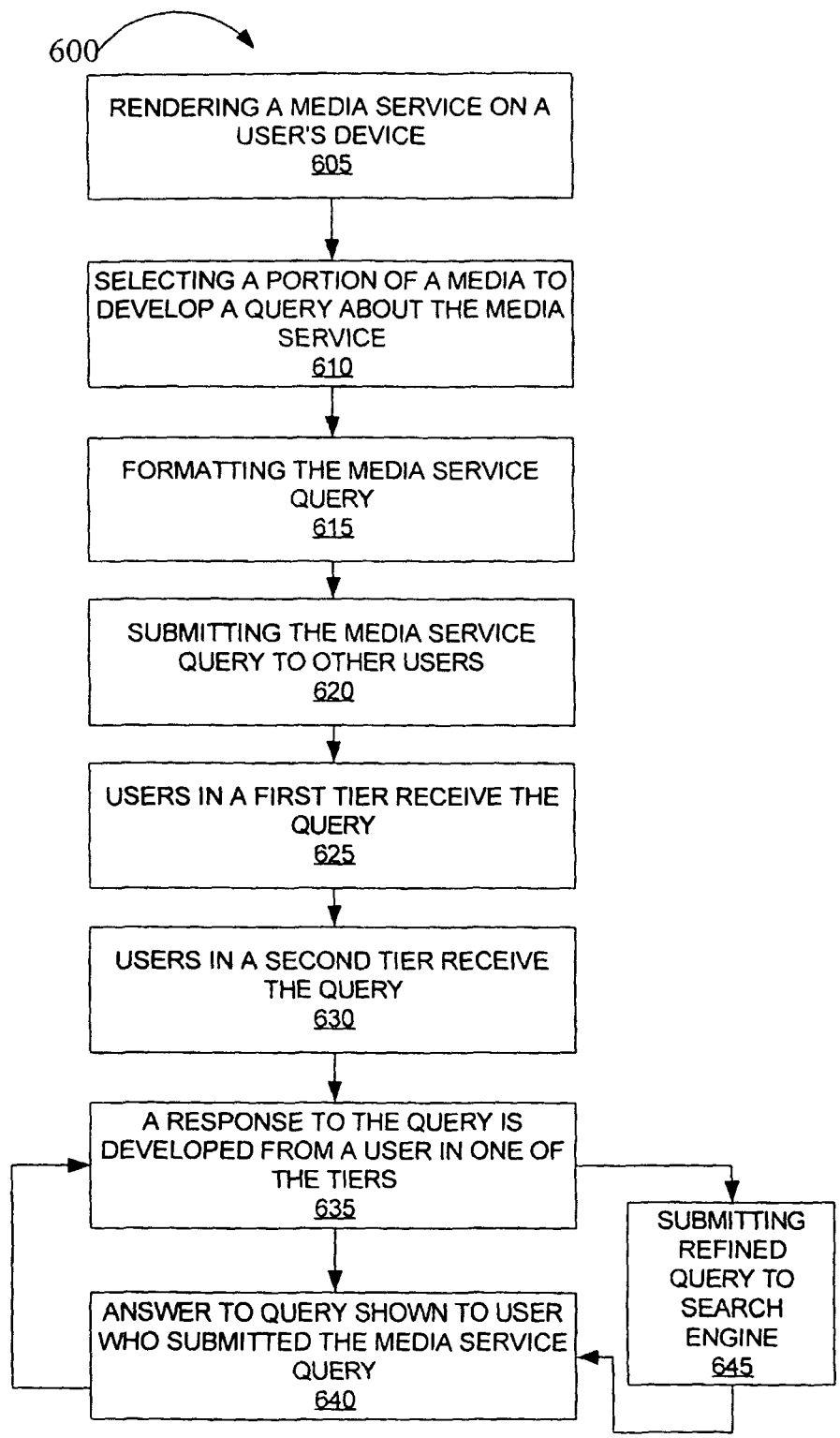
FIG. 6 represents a flow chart of a method for a generating and responding to a media service query, in accordance with the principles of the present invention.

FIG. 6 presents a method 600 for implementing the communications between a first user and other users. In this method, the basics of this method operates around the use of multicast groups which can be joined or left by the use of "join" and "leave" commands which specifies the particular media service which is transmitted on various multicast channels. The method also operates with a second communication pathway (for the communications about media services) which is also joined or left.

In step 605, a user 501 is watching a particular media service which is being broadcasted on a selected multicast channel; it is presumed that users associated with the third tier 530 are also accessing the multicast channel and are watching the media service as the same time as user 501.

Step 610, has user 501 submitting/formulating a query about a particular feature of media service (as described above) as in FIG. 4B above. Other ways user 501 can submit queries about a particular media service includes composing a textual based question and/or touching a display device as to signify a region of interest. Other methods of composing such queries by user 501 are to be contemplated in accordance with the principles of the present invention. For example, the user will select a portion of the media service using an input device, where the selected portion of the media service can represent a still image or a video sequence.

In step 615, a media device being operated by user 501 captures the substance of user 501 query and formats such a query into information that is capable of being transmitted via the second communication pathway for communication to users that are part of third tier 530

In step 620, the substance of the user query is submitted to users that are part of the third tier 530 via the second communication channel. Likewise, users that are part of the first tier 510 receive the contents of the query in step 625 via the second communication channel or by another communication means such as e-mail, text message, internet message relay, and the like. Additionally, in step 630, users associated with the second tier 510 receive the contents of the first user's 501 query via the second communication channel or another communications means, as explained above.

Eventually, it is contemplated that a user, that is part of first tier 510, second tier 520, and/or tier 530 will respond to first user's 501 query with an answer. This response in step 635 is communicated back to first 501 via the second communication channel, or other communication means, in a manner similar to what was described above for FIG. 4C.

In step 640, the first user will see the results of the answer formulated in step 635 in a manner consistent with FIG. 3C. It is contemplated that the communications between the users responding in steps 635 and 640 can be repeated as long as desired by the users taking part in such communications.

Step 645 represents a part of the method which is optionally run in parallel to the communications that are taking part in steps 635 and 640, where there is an automatic computer enhancement that occurs. Specifically, while different information is going back and forth between user 501 and users that are part of tiers 510, 520, and 530, the media device being operated by user 501 is running a background program which is keyword sensitive, where the computer program is capable of extracting from the communications keywords which supposedly have strong interest. For example, such keywords can be identified from the communications in reference to a list of keywords, where various scores are pre-assigned to various words, frequency of the usage of such keywords can also be used for determining the value of such words, the program guide information associated with the media service, and/or the media device can operate a linguistic recognition routine, as used by a search engine like GOOGLE or YAHOO in determining the relevancy of words found on a web page, which such web service use to develop a group of keywords.

Regardless, of how the keywords are identified by the computer program from the communications in steps 635 and 640, such keywords in step 645 are submitted to a search engine, such as GOOGLE, YAHOO, ALTAVISTA, and the like, where the results of such a query are presented to user 501 in a manner similar to what is shown in FIG. 3C. This approach for submitting the query to a search engine is to operate, ideally, after the exchange of responses have begun between the first user and the users associated with different tiers. In this way, the communications with the parties can be more pertinent than the original by having more keywords of interest or other information that can help the external service produce better results.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications can be effected therein by one of ordinary skill in the pertinent art without departing from the scope or spirit of the present principles. All such changes and modifications are intended to be included within the scope of the present principles as set forth in the appended claims.

The invention claimed is:

1. A method for developing a query comprising the steps of:
   formulating a query by designating a portion of a rendered media service in response to input from a first user,
   transmitting said query to a first tier of users, where the users which form the first tier of users are users that have been designated by a first user;
   transmitting said query to a second tier of users, where the users forming said second tier are automatically selected in view of a content category that said first user assigns to said media service; and
   receiving information corresponding to said query, where said information is received from at least one of: at least one user from said first tier of users and at least one user from said second tier of users;
   displaying additional results which are generated from keywords extracted from communications between said first user whose input causes a formation of said query and said received information from said at least one user from said first tier of users and said at least one user from said second tier of users where such keywords are extracted by use of an automated computer method and said keywords are submitted to a search engine for the additional results.

2. The method of claim 1, wherein said received information is rendered after such information is received.

3. The method of claim 1, wherein said media service is received via a multicast channel and information about said query is transmitted via a second multicast channel.

4. The method of claim 1, comprising the additional step of:
   transmitting said query to a third tier of users, where the users forming said third tier are accessing said media service at the same time as said first user.

5. The method of claim 1, comprising the additional step of:
   transmitting said query to a third tier of users, wherein a user of said third tier will receive said query if said media service was accessed by said user of said third tier within a time prescribed by said user of said third tier.

6. An apparatus that develops a query comprising:
   a processor configured to formulate a query by designating a portion of a rendered media service in response to input from a first user,
   a processor configured to transmit said query to a first tier of users, where the users which form the first tier of users are users that have been designated by a first user;
   said processor configured to transmit also transmits said query to a second tier of users, where the users forming said second tier are automatically selected in view of a content category that said first user assigns to said media service; and
   a processor configured to receive information corresponding to said query, where said information is received from at least one of: at least one user from said first tier of users and at least one user from said second tier of users;

a processor configured to display additional results which are generated from keywords extracted from communications between said first user whose input causes a formulation of said query and said received information from said at least one user from said first tier of users and said at least one user from said second tier of users where such keywords are extracted by use of an automated computer using a processor configured to extract keywords and said keywords are submitted to a search engine for the additional results.

7. The apparatus of claim 6, wherein said received information is rendered to be displayed after such information is received.

8. The apparatus of claim 6, wherein said media service is received via a multicast channel and information about said query is transmitted via a second multicast channel.

9. The apparatus of claim 6, additionally comprising:
said processor configured to transmit transmits said query to a third tier of users, where the users forming said third tier are accessing said media service at the same time as said first user.

10. The apparatus of claim 6, additionally comprising:
said processor configured to transmit transmits said query to a third tier of users, wherein a user of said third tier will receive said query if said media service was accessed by said user of said third tier within a time prescribed by said user of said third tier.

* * * * *